Feb. 1, 1944. G. A. UNGAR 2,340,630
FLUID DISPENSING DEVICE
Filed Jan. 30, 1941 6 Sheets-Sheet 1

INVENTOR
Gustave A. Ungar

INVENTOR
Gustave A. Ungar

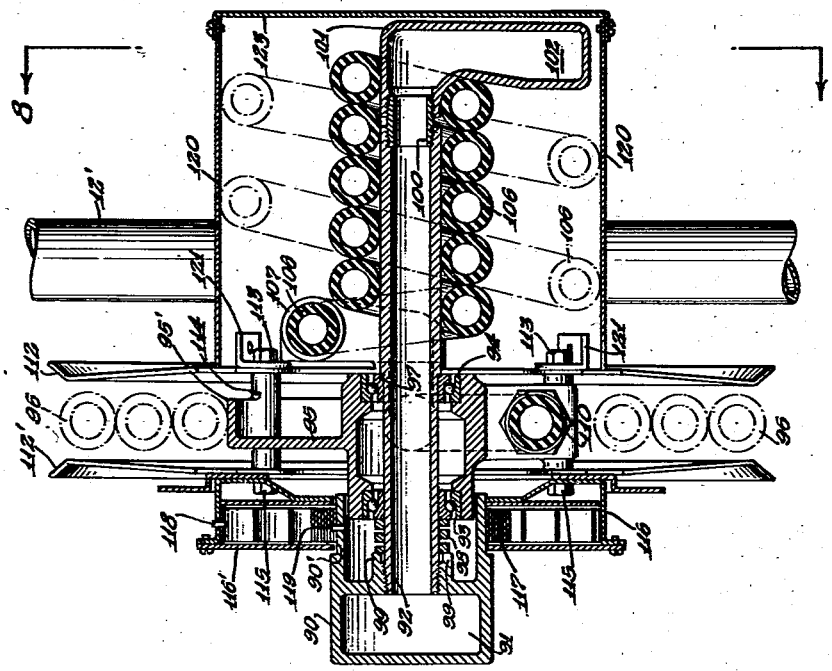
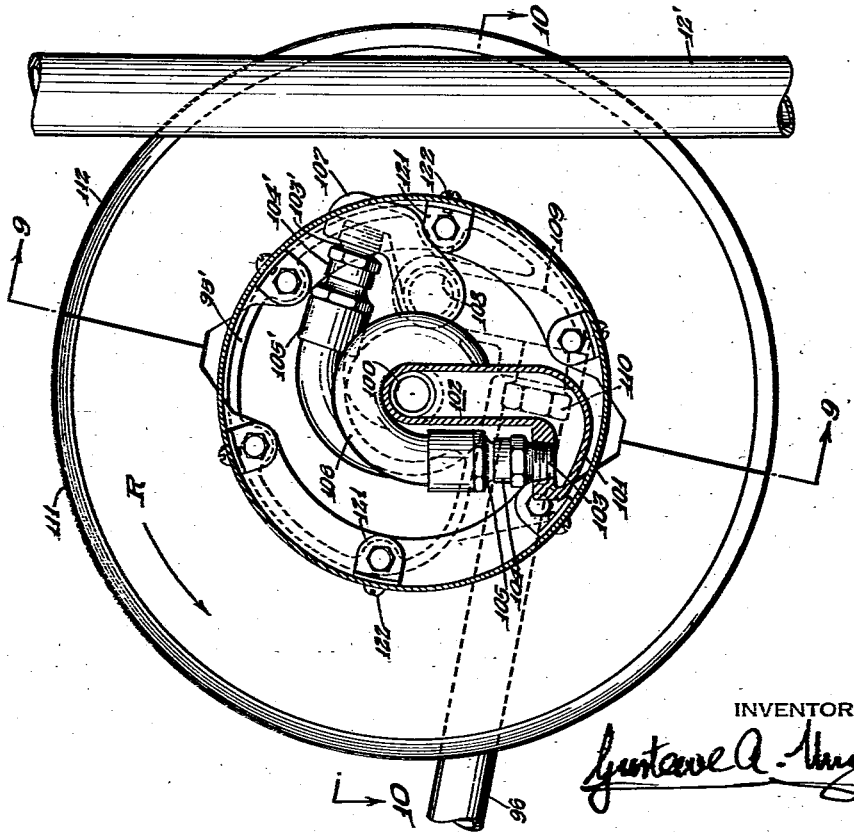

Feb. 1, 1944.  G. A. UNGAR  2,340,630
FLUID DISPENSING DEVICE
Filed Jan. 30, 1941   6 Sheets-Sheet 4

INVENTOR
Gustave A. Ungar

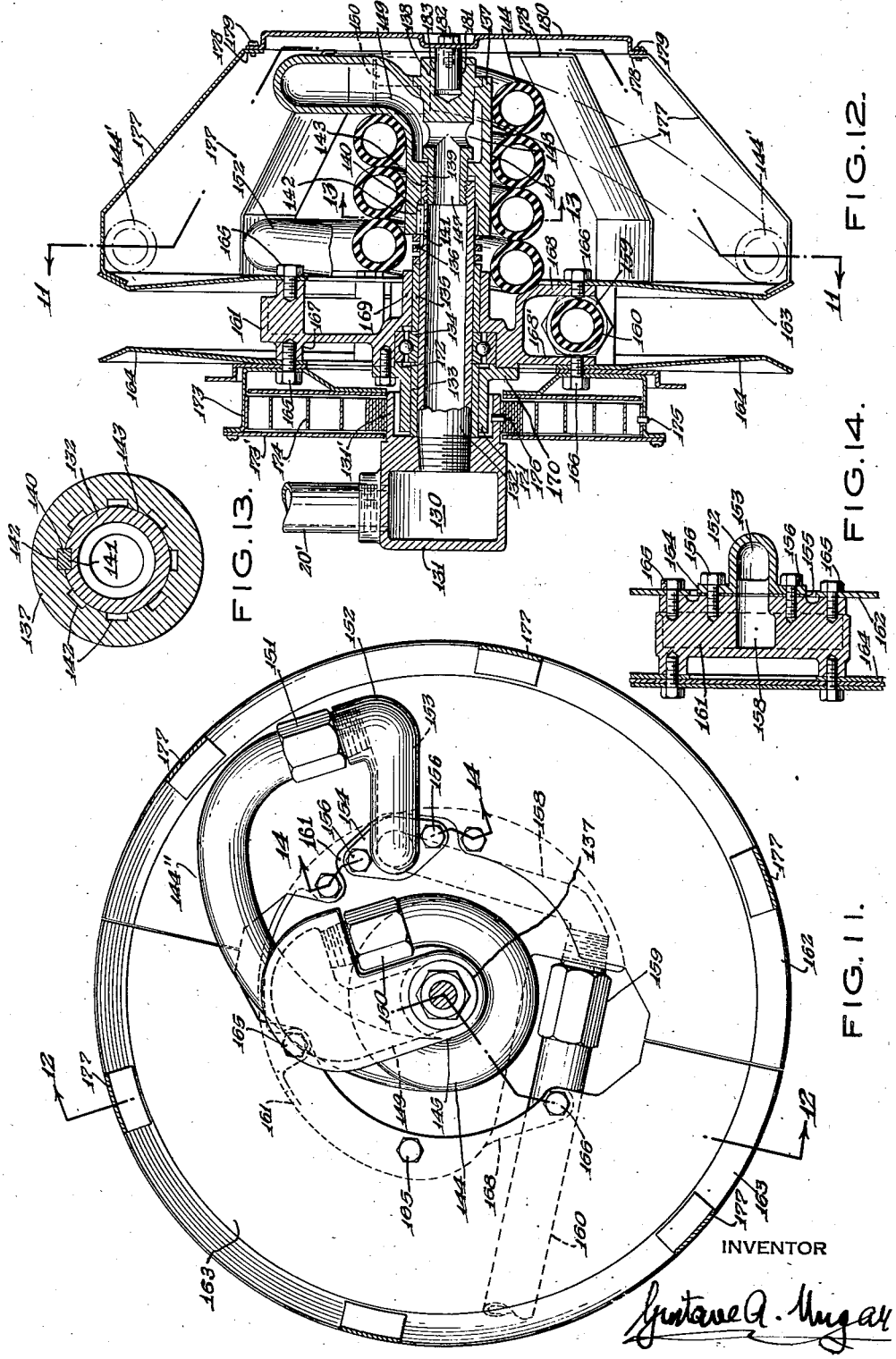

Feb. 1, 1944.　　　　G. A. UNGAR　　　　2,340,630
FLUID DISPENSING DEVICE
Filed Jan. 30, 1941　　　6 Sheets-Sheet 6
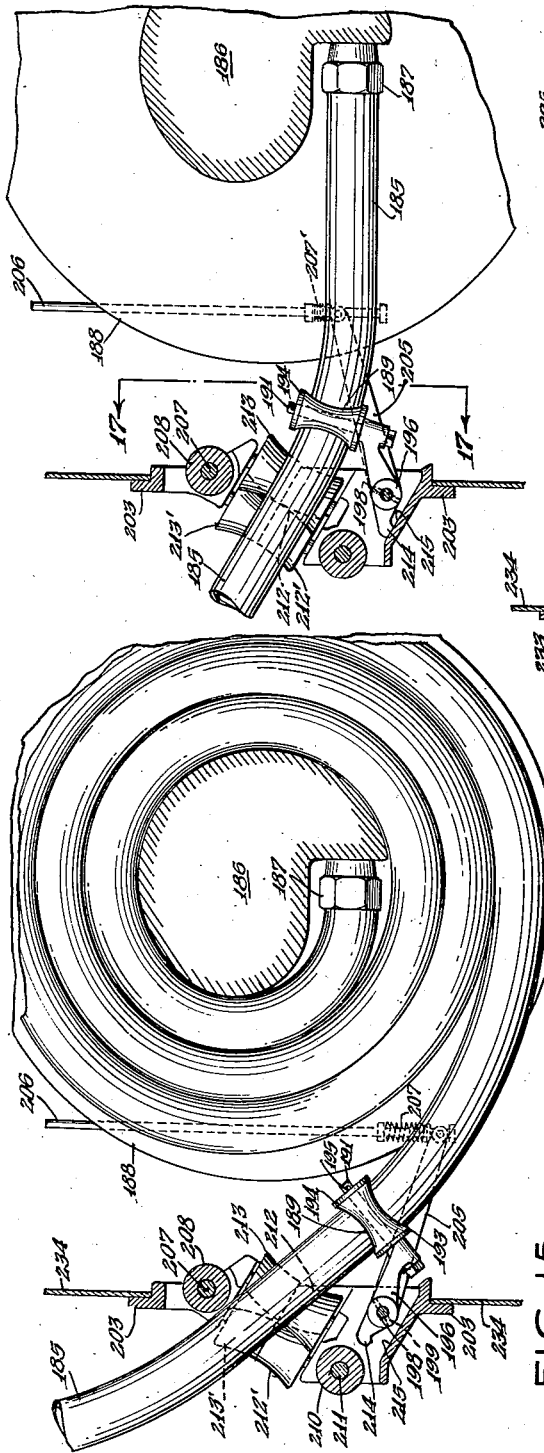
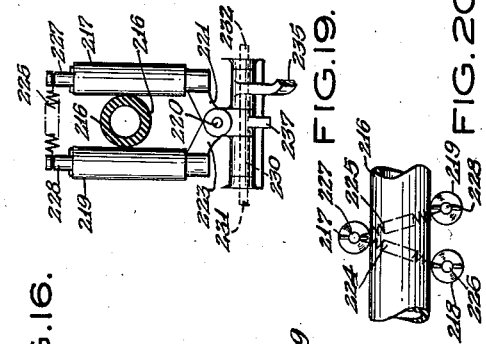
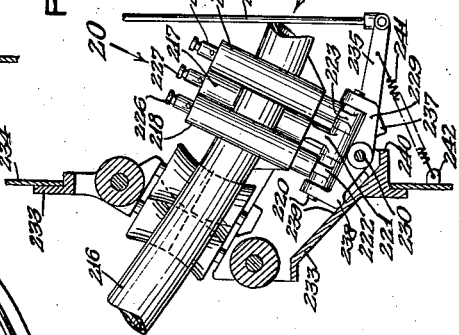
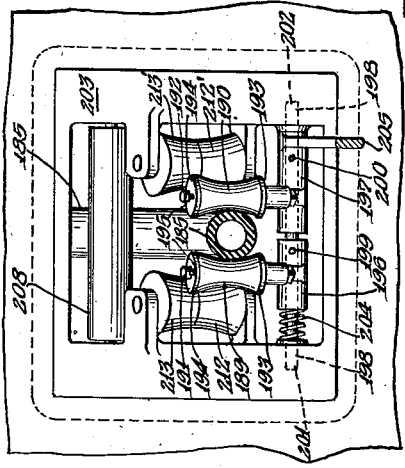
INVENTOR
Gustave A. Ungar Patented Feb. 1, 1944

2,340,630

UNITED STATES PATENT OFFICE 2,340,630

FLUID DISPENSING DEVICE

Gustave A. Ungar, New Rochelle, N. Y., assignor, by mesne assignments, to Equi-Flow Inc., New York, N. Y., a corporation of New York Application January 30, 1941, Serial No. 376,565

7 Claims. (Cl. 299—79)

This invention relates to fluid dispensing devices and more particularly to devices for dispensing gasoline and similar fuels used for internal combustion engines. The dispensing device is of the type wherein the flexible hose is adapted normally to be coiled upon and about a shiftable storing device and in a manner such that the hose may be uncoiled therefrom and extended for dispensing use or, alternatively, may be recoiled thereon, and preferably automatically, when not in use.

Among the objects of the present invention are to provide a liquid dispensing device, and particularly a gasoline dispensing device of the wet hose type, constructed so as to eliminate the necessity for stuffing box or rotary seal connection between the stationary liquid supplying pipe comprising a part of the dispensing line and a turnable or shiftable hose reel or equivalent device upon which the flexible portion of the dispensing line is normally coiled, while at the same time providing a leakproof connection between the stationary and the movable portions of the liquid dispensing line, not only to permit continuous liquid flow therethrough when desired but also to permit coiling and uncoiling of the flexible hose upon and from the storing device; to provide a structure of the above character which is leakproof, thereby eliminating deterioration of the material of which the flexible hose is composed and also preventing hazards of conflagration due to leakage of the hazardous liquids; to provide a device of this character which is economical to manufacture and operate and which is also adapted to maintain a substantially constant pressure in the flexible hose when coiled upon or uncoiled from the hose storing device.

Among the other objects and advantages of the invention is to provide a simple and safe actuating control to start the flow of liquid when the coiled hose is pulled out from its storing device and to stop the flow of liquid when the uncoiled hose returns into its storing device.

A further object of this invention is to provide means by which the dispensing hose during any part of its emergence from the cabinet housing the device, engages means to start the flow of liquid and during any part of its return to the cabinet stops the flow of liquid.

Another object of this invention is to provide means by which the dispensing hose must be pulled out a certain distance from its cabinet before it engages means to start the flow of liquid and to stop the flow of liquid before the hose has completely returned into its cabinet.

A further object of this invention is to provide means requiring the operator of the dispensing device to keep the hose pulled out to any desired length in order to actuate from the dispensing hose means to start the flow of liquid and to keep it flowing as long as tension is maintained on the hose and to stop the flow of liquid as soon as tension on the hose has been released, thereby providing automatic stoppage in case of neglect or incapacitation of the operator and to provide these and other objects and advantages the nature of which will be apparent from a perusal of the following specification when taken in connection with the accompanying drawings, wherein:

Figure 7:
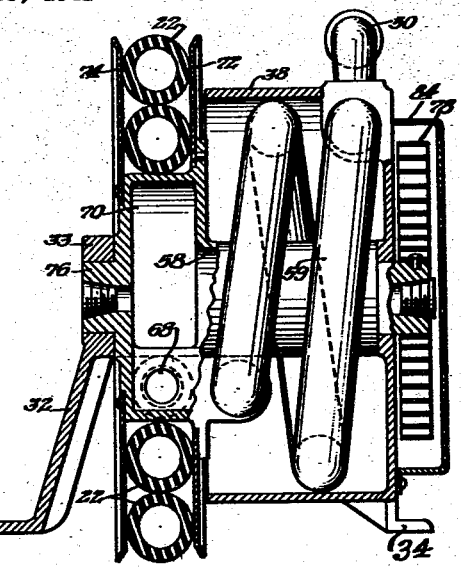
Figure 2:
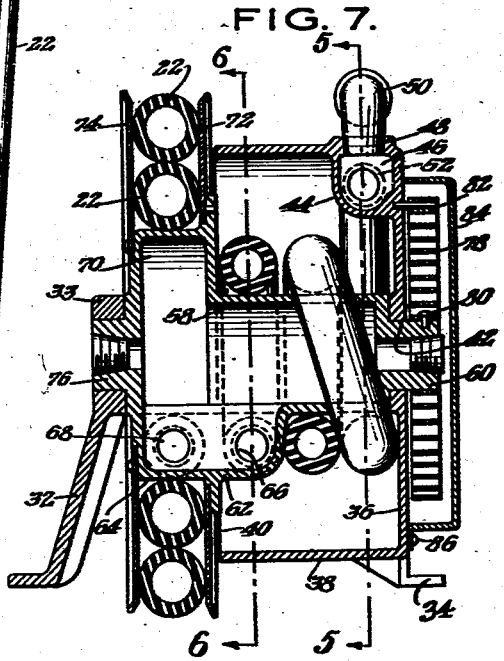
Figure 2 is a section taken on the line 2—2 of Figure 1.
Figure 3:
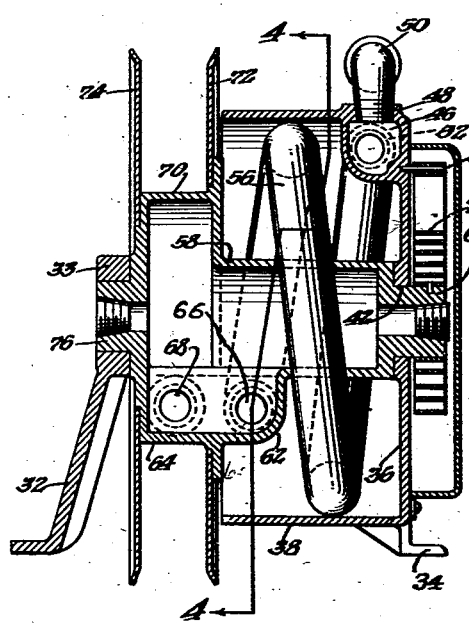
Figure 3 is a section showing the hose storing device in shifted position with the flexible hose extended therefrom for the dispensing operation.
Figure 4:
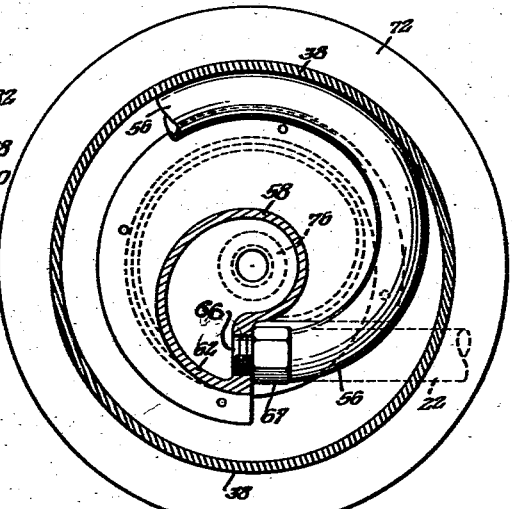
Figure 4 is a section on the line 4—4 of Figure 3.
Figure 5:
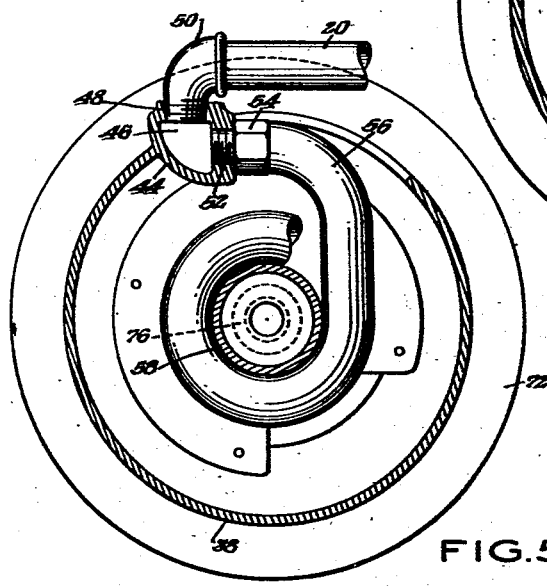
Figure 6:
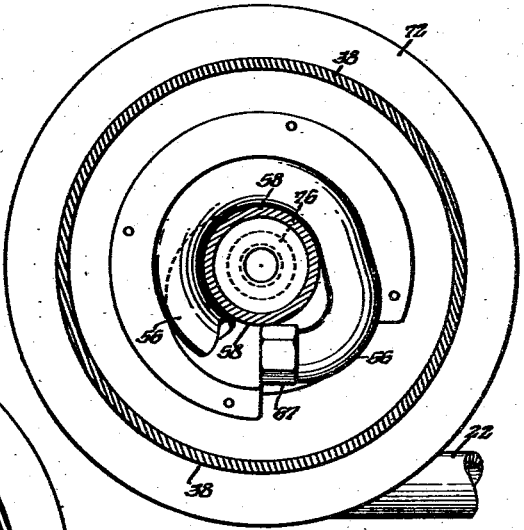

Figures 5 and 6 are sections taken on the lines 5—5 and 6—6 respectively, of Figure 2;

Figure 7 is a sectional view corresponding to Figure 3, but showing a modification arranged so that the connecting portion of the flexible hose is in loosely coiled formation when the terminal dispensing hose is coiled upon the hose reel, whereby to maintain substantially constant pressure in the flexible portion of the flow line during coiled or uncoiled condition of the terminal hose by maintaining the volume of liquid contained in the terminal dispensing hose and in the connecting hose substantially constant, which is not the case in the form illustrated in Figures 1 to 6 inclusive.

Figure 8 is a section taken on the line 8—8 of Figure 9 showing a modified hose storing device with terminal hose fully extended and the connecting hose, provided with hose unions at both ends for convenient installation, completely coiled.

Figure 9 is a section taken on the line 9—9 of Figure 8.

Figure 10:
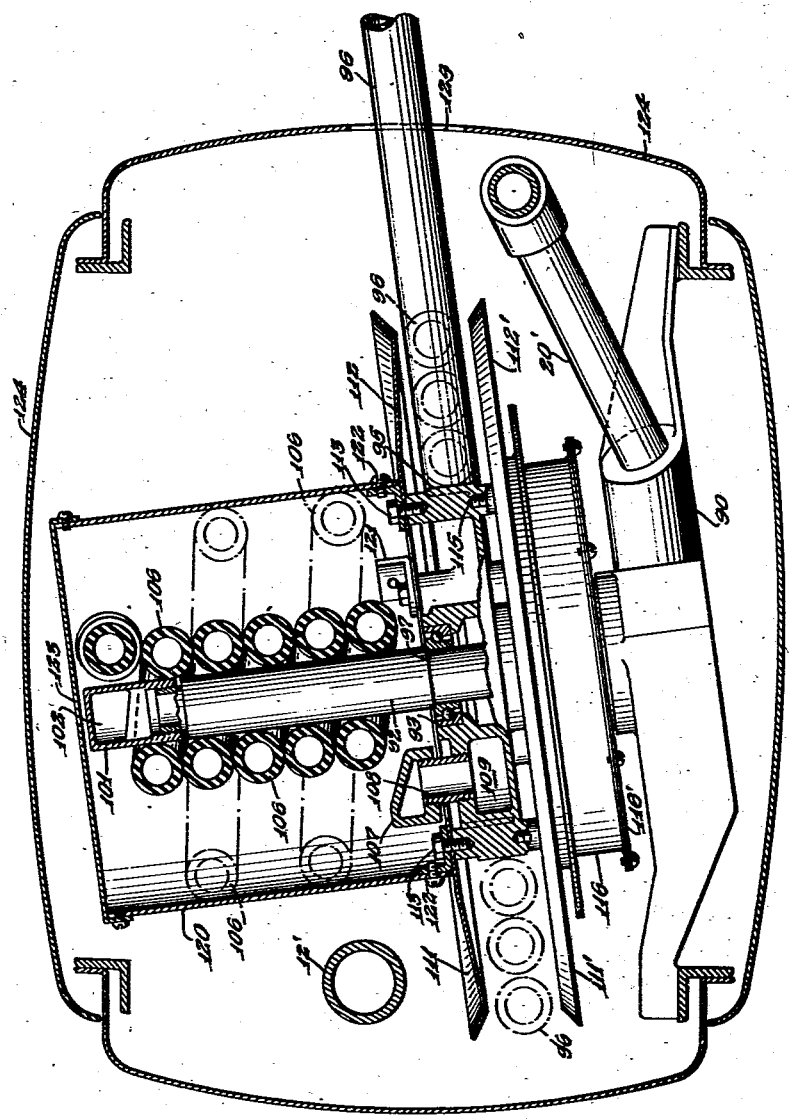

Figure 10 is a section on the line 10—10 of Figure 8 with parts partly in perspective view;

Figure 11 is a section on the line 11—11 of

Figure 12 showing a preferred form of the hose storing device showing the terminal hose fully extended and the connecting hose completely coiled to its smallest diameter, the connecting hose having fixed hose couplings with other means for ready connection and disconnection of the terminal hose;

Figure 12 is a section on the line 12—12 of Figure 11;

Figure 13 is a section on the line 13—13 of Figure 12;

Figure 14 is a section taken on the line 14—14 of Figure 11;

Figure 15 is a section showing the hose storing device with the terminal or dispensing hose completely stored or wound up and the liquid flow controlling means actuated by the terminal hose in the stop-flow position;

Figure 16 is the same section as that shown in Figure 15 but with the terminal or dispensing hose completely extended or pulled away from the reel and the liquid flow controlling means actuated by the terminal hose in the position where liquid flow is permitted;

Figure 17 is a section taken on the line 17—17 of Figure 16;

Figure 18 is a section showing a modified form of liquid flow controlling means actuated by the terminal or dispensing hose in the position where the hose is being pulled out or is kept extended under tension;

Figure 19 is a view along arrow 19 of Figure 18;

Figure 20 is a view along arrow 20 of Figure 18.

Referring now to the invention in detail, it will be understood that wherever the term "gasoline" is set forth in the claims the expression is used to include any suitable type of liquid fuel adapted for use in internal combustion engines. It is also to be understood that the embodiments of the invention shown in its adaptations to the present-day type of service station pump does not restrict the invention to such single adaptation but that the invention is equally adaptable to trucks and other vehicles having hose coiling or storing devices thereon. It is also understood that the embodiments of the invention in its adaptations to service station pumps do not restrict the invention to such adaptations for liquid fuels but that the invention is equally adaptable to the handling of any kind of fluid, either liquid or gas, provided always that the connecting and terminal hose is made from a material capable of withstanding the chemical action of the fluid handled.

Figure 1:
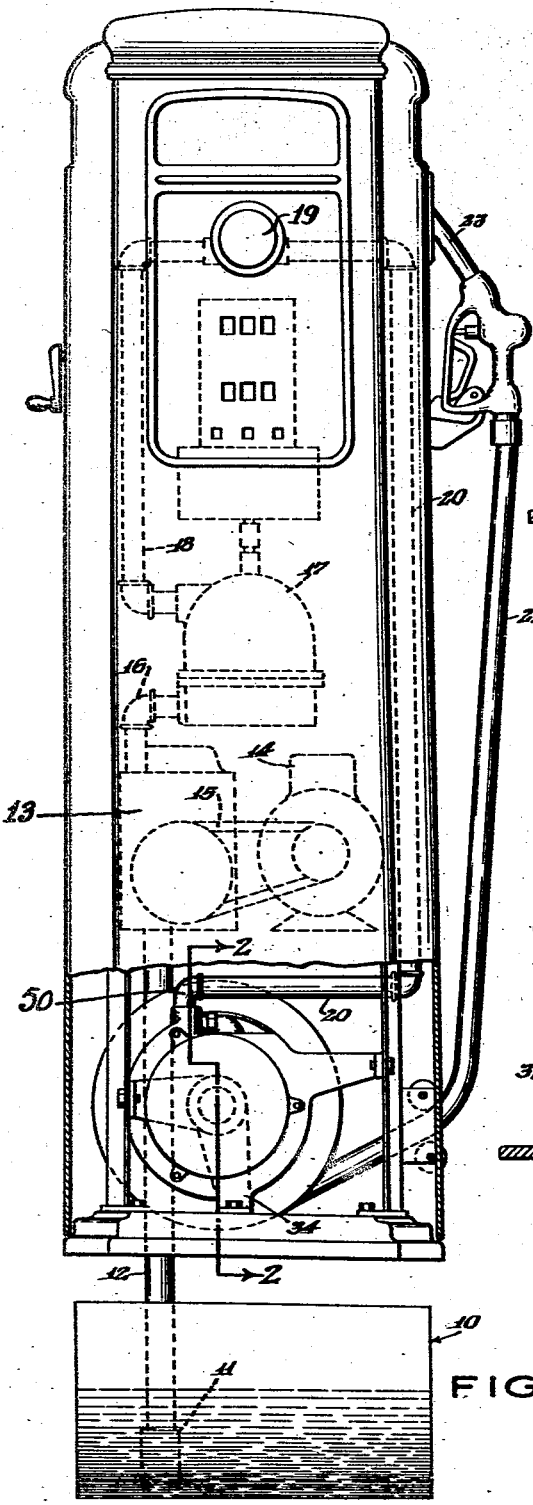
Figure 1 is a perspective view, with parts partly broken away, showing the adaptation of one form of the present invention to the present-day type of service station pump.

Referring to the adaptation of the invention to the present day type of service station pump as shown in Figure 1, this figure shows diagrammatically at 10 the usual type of underground tank adapted to contain a quantity of gasoline or similar liquid, and wherein is arranged the usual type of foot valve 11 extending into the liquid of the tank at the bottom end of the usual dispensing line 12, which line extends upwardly through the bottom of the service station pump and within the usual type of enclosing housing therefor. This line 12 connects to the inlet side of the usual pump 13 driven by a motor 14 through a driving connection 15 herein shown as a belt. The discharge side of the pump 13 connects by means of another portion 16 of the dispensing line to any type of meter 17. The meter discharge is connected through another portion 18 of the dispensing line to any type of sight gauge 19, the discharge side of which connects by still another portion 20 of the dispensing line to a hose storing device shown in detail in the remaining figures of the drawings. This hose storing device is preferably mounted on the base of the service station pump and is enclosed within the housing or casing of the pump. In general, the hose storing device comprises means for normally retracting a flexible hose to a stored position within the housing. Such flexible hose 22 is provided with a terminal nozzle 23, which nozzle may or may not be stored upon the usual type of hose support hereinafter referred to. In general, the hose storing device may be arranged to permit the flexible hose 22 to be uncoiled therefrom and to be extended through an opening in the housing simply by pulling upon the nozzle end of the hose and conversely, is constructed whereby automatically to retract or retrieve the hose in stored condition on the storing device within the housing by releasing the tension on the nozzle end of the hose. This retraction may be accomplished by spring means or by power means, as desired. In the present instance it is shown as automatically retracted by spring means.

The nozzle 23 for the flexible hose is herein shown as provided with a manually actuated control valve and it is understood that the pump 13 is provided with the usual type of spring loaded by-pass, the arrangement being such that when the pump is started and the nozzle valve is closed the pump will continuously by-pass the liquid around itself, the entire dispensing line, including the flexible hose, constantly being full of liquid so that when the nozzle valve is opened, immediately the operating pump will force liquid through the entire flow line and out of the nozzle for dispensing. This is known as a wet hose type of dispenser, and practically all dispensing systems which utilize driven pumps and a liquid displacement meter are of the wet hose type.

Referring now to the details of construction of the hose storing device, the same is provided with a pair of rigid supports, one of which supports 32 is provided with an apertured bearing 33, hereinafter referred to, and the other of which supports 34 is formed as a stationary portion of the hose reel. This stationary portion is in the form of a hollow casting having a lateral side wall 36 and a relatively broad circumferential flange 38 presenting an opening 40 opposite to the wall 36. The wall 36 is provided with a central opening 42 in line with the bearing 33, formed on the opposite support 32, for the purpose of receiving the shaft portions of the turnable or shiftable part of the hose storing devices hereinafter referred to. In addition, the stationary portion of the hose reel is provided with a preferably integral cast wall 44 providing an inlet chamber or connector 46 having a threaded connection 48 adapted to receive an L-shaped fitting 50, which in turn connects to the dispensing line 20. In addition, the wall 44 is provided with a threaded connection 52 for a fitting 54 to which a flexible portion 56 of the dispensing line is connected.

The movable portion of the hose storing device, herein specifically shown as a hose reel, comprises a centrally disposed rotatable casting or portion including a reel or drum 58 having at one end a laterally extending hub 60 adapted to pass through the opening 42 in the end face 36 of the stationary portion of the device for rotation therein, and this drum member 58 is provided with a laterally and preferably radially extending hollow projection 62, which likewise extends axially in the direction of axis of turning of the drum as at 64, see Figure 3. This hollow portion 62 is provided with a spaced separate connection or opening 68 and with a threaded connection 66. The opening 66 connects, by means of a fitting 67, with the opposite end of the length of the flexible conduit or hose 56, while the opening 68 connects, by means of a fitting not shown, with the terminal flexible hose 22.

The rotatable reel or drum 58 at its end opposite to the hub portion 60 is formed as an enlarged drum or reel 70 around which is adapted to coil the flexible terminal hose 22, as shown in Figure 2. The reel portion 70 is provided with radially extending, spaced plates 72 and 74 forming extensions of the reel to receive the coils of the hose therebetween. At its extreme end the reel 70 is provided with a laterally projecting hub portion 76, which is adapted to project into the aperture of the bearing 33 to rotate therein.

The peripheral flange 38 extends across in slight spaced relation to the extension plate 72 so as to enclose the coiled length 56 of the flexible hose. This flexible portion of the dispensing line is permanently coiled about the movable reel portion 58 of the storing device, the coils of the portion 56 being arranged so that as the terminal flexible hose 22 is uncoiled from or coiled upon the reel 70 the coils of the portion 56 will automatically contract or expand or contract in a manner to permit relative turning between the stationary and the movable portions of the hose reel, while at the same time permitting the liquid to be dispensed through the dispensing line, including the flexible portions of the dispensing line, in a fluid-tight manner. In the instance shown in Figures 2 and 3 the coils of the flexible portion 56 are arranged so that when the terminal hose 22 is coiled upon the reel 70 the coils 56 will have contracted or will have been coiled up. The coils 56 will be in their most contracted, coiled condition, lying snugly around the inner wall of the reel, whereas when the hose 22 is uncoiled from the reel the coils will shift to their most uncoiled or expanded position, as shown in Figure 3 or in the modification shown in Figure 7. The reverse arrangement of the coiling may be used with the accompanying extra advantage hereinafter set forth. In the arrangement shown in Figures 2 and 3 the coils 56 are arranged in a direction reversely disposed with respect to the direction in which the coils of the terminal flexible hose 22 are disposed on the reel portion 70, and the length of this flexible hose portion 56 is arranged so that when the flexible hose 22 is stored or coiled upon the reel 70 the coils will preferably be in their contracted or closely coiled position, as shown in Figure 2, whereas when the flexible hose 22 has been uncoiled or drawn from the reel 70 the flexible hose 56 will have uncoiled its maximum extent to the position shown in Figure 3. By arranging the length of the hose 56 and coiling it in this manner with one end stationarily connected to the stationary part of the reel and the opposite end connected to the movable part of the reel, I avoid the necessity of using a liquid seal, while at the same time I maintain a completely leakproof fluid connection between the stationary and the movable portions of the dispensing line and also permit the coiling and uncoiling of the flexible hose upon and from the reel. The use of stuffing boxes or rotary seals is objectionable because of their tendency to leak upon continued use and it is of the utmost necessity in the handling of hazardous liquids that no leakage occur.

In Figures 2 and 3 I have shown a simple arrangement of spring means for normally holding the rotatable reel 58 in wound up position so that when the flexible hose 22 is released it will tend to wind upon the reel, thereby normally storing the hose on the reel. This comprises any type of coil spring 78 having its inner end attached as at 80 to the rotatable hub 60 and having its outer end attached as by means of a pin 82 to the stationary casting 44 of the stationary portion of the hose storing device. The spring is normally placed under tension, tending to wind the movable reel to hose storing position, the arrangement being such that when the hose is released, will tend to return the reel to hose coiled or stored position. A suitable cover 84 is provided for this spring, the cover being attached to the stationary housing by means of fastening devices 86.

In certain instances I may use the construction illustrated in Figure 7, which embodies a slight modification of the construction shown in Figures 2 and 3. In the use of the wet hose type of device, due to the fact that the flexible hose and dispensing line are always full of liquid under pressure when the hose is coiled upon the reel, the coiling operation tends to put the liquid confined in the flexible hose under greater pressure. In the construction shown in Figure 7, I have provided means for maintaining substantially normal or constant the pressure in the flexible hose and connected dispensing line irrespective or whether the terminal hose is coiled upon or uncoiled from the hose reel. As clearly shown in Figure 7, the portion 59 of the coiled hose is coiled in a direction opposite to its direction of coiling, as shown in Figure 3. In short, in Figure 7, when the hose 59 is in its loosely coiled state, and when the hose is uncoiled and pulled from the reel the movement of the reel tends to tighten the coil of the flexible portion 59. By means of this arrangement any additional pressure created in the coils of the terminal hose 22, due to being coiled upon the reel, can relieve itself into the loosely formed coils of the portion 59, and contrarywise, when the portion 59 is coiled more tightly the additional pressure can relieve itself into the uncoiled hose portion 22.

Both of the flexible hose portions are preferably formed on the inside of synthetic rubber such, for instance, as thiokol or neoprene and the hose portions 56 and 59 are preferably molded in coiled formation, whereby such portions will naturally in their free state retain such form so that there will be practically no stress on the hose when it is coiled in coiled condition upon the reel.

Referring to the modifications shown in Figures 8, 9 and 10, we see a portion of the dispensing line 20', which corresponds to dispensing line 20 in Figure 1, connected to the hollow support 90, corresponding to support 32 in Figure 2. From cavity 91 the liquid passes into pipe 92 which is threaded in liquid-tight connection into support 90, and which carries on ball bearings 93 and 94 reel drum 95 for the dispensing or terminal hose 96. The reel is located axially by means of shoulder 97 and spring 98 held in tension between bearing 93 and pipe hub 99.

Into the free end of pipe 92 is threaded nipple 100, which in turn is screwed into stationary hose connector 101, which has a passage 102 leading to nipple 103, which forms at its upper portions the male half of detachable hose union, with coupling nut 104, of which 105 is the female part, firmly connected to connecting hose coil 106. At its inner end coil 106 is connected by means of a similar detachable hose union 105', 104' and 103' to rotating reel connector 107 which in turn is connected by means of short nipple 108 to passage 109 cored into real drum 95. This passage 109 leads to tangentially located male hose coupling 110 which is tightly screwed into reel connector 107. Terminal hose 96 is attached to coupling 110 and the path of the liquid is now established, in order to permit coiling of hose 96 on the cylindrical drum portion 95, guide plates 111, 112 are attached with screws 113 to one face of drum 95 by means of lugs 114 and guide plates 111' and 112' are attached to the other side of drum 95 with screws 115.

Housing 116 containing main hose reel winding coil spring 117 is also attached to reel 95 by means of screws 115. Spring 117 is shown in tightly coiled position, with dispensing hose 96 fully extended and connecting hose 106 tightly coiled. Spring 117 is locked into housing 116 by means of pin 118 and it is attached to the stationary hub extension 90' of support 90 by means of pin 119. Spring cover 116' is detachably connected to spring housing 116.

When spring 117 has completely retracted hose 96 (which is now shown by coils 96) after making three full turns of the reel in the direction of arrow R the connecting hose has now expanded from 5 small coils 106 into 2 large coils 106. In order to prevent the connecting hose from dropping or fouling into other parts of the dispensing unit, a drum 120 is provided detachably connected to guide plates 111 and 112 through angle plates 121 and screws 122. The front end of drum 120 is closed by means of detachably connected cover 123.

It will be readily seen that the connecting hose 106 can be readily attached to connectors 101 and 107 when hose 96 is completely pulled out and when drum 120 is detached.

It will also be seen that this embodiment permits of keeping the outside diameter of the connecting hose structure to a minimum. The axial length however must be sufficient to accommodate the requisite number of small coils.

In Figure 10 can be seen the small diametral space requirements of drum 120 and the position of reel drum 95 with its guide in such a position that hose 96 emerges from cabinet 124 through a centrally located opening 125. Suitable guide rollers in this opening for hose 96 will be described in connection with Figures 15 to 20 inclusive.

The disposition in relation to the hose reel of pipe 12' corresponding to dispensing pipe 12 in Figure 1 is also indicated in Figures 8, 9 and 10.

The embodiment of my invention shown in Figures 11 to 14 inclusive provides an arrangement of reduced axial length and also quick attachment and detachment of the connecting hose coil without the use of hose unions.

The liquid delivered through pipe 20' corresponding to pipe 20 in Figure 1, enters cavity 130 of pipe supporting bracket 131 into which is threaded in liquidtight connection reel supporting pipe 132. Bearing sleeve 133, double thrust ball bearing 134, bearing sleeve 135 are pressed against bracket 131 through compressed spring 136 and the stationary hose connector 137, which is detachably connected to the reel supporting pipe 132 by means of screw plug 138 and is kept liquidtight by means of packing ring 139. Rotation between hose connector 137 and pipe 132 when tightening plug 138 is prevented by feather key 140 seated in keyseat 141 of pipe 132 and in one of the splines 142 (see Fig. 13) provided in the hollow recess 143 of hose connector 137 so as to permit of coiling connecting hose 144 tightly around hub 145, regardless of slight length variations of the hose. Plug 138 is provided with a hexagon head to permit of screwing it tightly against packing ring 139. From pipe 132 the liquid passes through passages 147 and 148 into the cored passage 149 of hose connector 137, into which is screwed male connecting hose coupling 150 to which is permanently attached the flexible connecting hose 144 shown wound in four tight coils around hub 145. At its inner end hose 144 has a connecting length 144'' which leads by means of male hose coupling 151 to rotating hose connector 152 into which it is screwed. Hose connector 152 has an inwardly extending passage 153 which terminates in flange 154 held in liquidtight detachable connection against reel casting 161 by means of packing gasket 155 and screws 156. The liquid which has passed through connecting hose 144 and passage 153 enters the rotating reel 157 through cored passage 158 and passes into the terminal dispensing hose 160 which is attached to reel 161 by means of male hose coupling 159. The reel casting 161 is provided with a cylindrical guide surface 161 around which hose 160 can be coiled when it is desired to retract it. For lateral guiding of the coiling hose 160 guide plates 162 and 163 on the outboard side and guide plate 164 are detachably mounted on reel 161 by means of screws 165 threaded into bosses 167 as far as the cylindrical guide surface 161 extends and by means of screws 166 which are threaded into cast arms 168 and 168' of reel 161 arranged to permit the free passage of hose 160. In order to rotatably support reel 161 upon pipe 132 it is provided with a hub extension 169 which rides on sleeve 135 and with a detachably connected cover 170 having a hub extension 171 which rides on sleeve 133. Shouldered recess 172 and the inside face of cover 170 bear against the outer race of double thrust ball bearing 134 and thereby provide axial stabilization of reel 161. Screws 165 and 166 holding guide plate 164 are also used to attach housing 173 with detachable cover 173' which surrounds coil spring 174, shown in tightly coiled form, required to retract terminal hose 160 from the fully extended position shown and coil it around the drum surface of reel 161. Spring 174 is attached to housing 173 by means of pin 175 and to hub extension 131' of pipe bracket 131 by means of pin 176.

Guide plates 162 and 163 are symmetrical half discs forming together a full circular lateral guide plate on the outboard side of hose reel 161. This permits their attachment to reel 161 after attaching without impediment connecting hose 144 at one end through connector 152 to reel 161, and on its other end through hose coupling 50 to cored passage 149 of hose connector 137.

Guide plate 164 is attached to the inboard side of hose reel 161. It can either consist of one disc or of two halves, same as the guide plates 162 and 163 attached to the outboard side of hose reel 161.

In order to provide a suitable retainer to catch the connecting hose when it uncoils into position 144' as one large coil with fully retracted terminal hose 160, arms 177 are welded to guide plates 162 and 163 and they extend outwardly tapering toward the center until they terminate in lugs 178 to which is attached by means of screws 179 the end plate 180. At the center of plate 180 is connected centering pin 181 by means of screw 182. Pin 181 finds a bearing in hole 183 of plug 138, thereby supporting plate 180 and arms 177 concentrically with reel drum 161 while it rotates on pipe 132. It will be seen that connecting hose 144 can be readily connected and disconnected from pipe 132 and reel 157, when the guide plates 162 and 163 are removed and reattachment of these guide plates to reel casting 161 is also readily accomplished when connecting hose 144 is coiled around hub 145 as shown, since then the screws 165 and 166 are readily accessible. This facilitates making a sub-assembly out of hose 144 and hose connectors 137 and 152 with liquidtight threads of pipe couplings 150 and 152 assured during bench assembly and thus avoiding leakage possibilities during service operations.

It will be seen that the provision of only four small coils of the connecting hose when the terminal hose is fully extended and one large coil of the connecting hose permits again three complete turns of the terminal hose reel, with a shorter axial space requirement than the embodiment of my invention shown in Figures 8, 9 and 10.

The preferred form of the control mechanism to start and stop the flow of liquid with the emergence from and the retracting of terminal hose into the pump cabinet as shown in Figures 15, 16 and 17 discloses in Figure 16 a terminal hose 185 fully retracted by being coiled around a reel drum 186 to which it is attached by means of male hose coupling 187. The liquid is supplied to drum 186 in any suitable manner for instance through any of the previously described embodiments of my invention. Hose 185 emerges from pump cabinet 188 and it is to be imagined that it is hanging on the outside of the pump cabinet in a manner similar to that of hose 22 illustrated in Figure 1. In order to provide suitable guiding of hose 185 with a minimum of resistance there are a series of guide rollers against each of which hose 185 may be in rolling contact depending in which direction it is extended. The hose upon leaving the guide plates of the reel drum as previously described and indicated by circle 188 enters between concave or hour glass shaped rollers 189 and 190, rotatably mounted on studs 191 and 192 respectively and axially kept in place by washers 193 and 194 and pins 195. Stud 191 is attached to lever 196 and stud 192 to lever 197. Lever 196 is slidably attached to shaft 198 by means of key 199 and lever 197 is attached to shaft 198 by means of pin 200 so that they will jointly turn with shaft 198 which is journalled at both ends in bearings 201 and 202 located in guide roller frame 203. Spring 204 serves to keep rollers 189 and 190 in contact with hose 185. Attached to the hub of lever 197 is also control lever 205 which actuates control rod 206 through an intermediary spring 207.

Hose 185 is prevented from sliding contact with the cabinet by roller 208, rotatably mounted in frame 203 on pin 209. Roller 210 rotatably mounted on pin 211 is provided for the rolling contact of hose 185 when it drops and rollers 212, 213, 212' and 213' rotatably mounted in frame 203 are provided for lateral frictionless guidance of hose 185.

In the fully retracted position of hose 185 shown in Figure 15 control lever 205 has pulled down control rod 206 which in turn through any suitable switch means, where electric motor operated pumps are used, or through suitable hydraulic valve means, where hydraulic motor operated pumps are used for handling the liquid which is being dispensed, has caused the liquid pump to be stopped.

In the fully extended position of hose 185 shown in Figure 16, the concave or hour glass shaped rollers 189 and 190 have been lifted up by hose 185 as it was unreeled from drum 186 and they have finally brought lever 205 into the position shown after pushing control rod 206 upwardly, thereby actuating the above mentioned switch or hydraulic valve means so as to cause the dispensing liquid to be pumped. Spring 207 has been compressed into position 207' thereby preventing possible damage to the control means when lever 205 is pulled up to its topmost position. There is also a lug 214 arranged on lever 205 which limits the upward movement of the lever by coming in contact with stopping surface 215 of frame 203.

It will be seen from the foregoing that the uncoiling of the dispensing hose 185 does not immediately start the flow of the liquid to be pumped, but a certain pre-determinable amount of hose length has to be pulled out before the liquid pumping control means will be actuated. The arrangement by which the control means are actuated to start the pump is not shown since such adjustable devices are well known to the art. It is also evident that the flow of liquid from the pump is stopped before the hose is completely retracted into the cabinet.

Furthermore the operator is required to exert a certain tension on the hose while dispensing liquid, since relaxing of tension will cause the weight of the sagging hose to pull down lever 205 and thereby stop the flow of liquid and eliminate any possible hazard through escaping liquid from an unattended pump.

The control mechanism shown in Figures 18, 19 and 20 also utilizes the movement of the terminal hose to start and stop the liquid pump, but in a different manner. Here hose 216, shown in fully extended position, similar to that shown in Figure 16, passes through three guide rollers 217, 218, 219 which are pivotally mounted on pin 220 by means of levers 221, 222 and 223. Guide rollers 217, 218 and 219 are kept in close contact with hose 216 by means of springs 224 and 225 which are attached to the journal pins 226, 227 and 228 of the guide rollers 217, 218, 219 which have roller surfaces made from elastic material, such as preferably rubber or neoprene.

Pin 220 is mounted in bracket 229 which in turn is pivoted on pin 230 having its outside ends supported at 231 and 232 in guide roller frame 233 which is mounted in cabinet 234. Attached to bracket 229 is also control lever 235, which in turn actuates control rod 236, the function of which is the same as that of control rod 206 previously described in conjunction with Figures 15, 16 and 17.

To limit the movement of bracket 229 suitable lugs 237 and 238 are provided on it which suitably contact stop surfaces 239 and 240 of frame 233. Spring 241 is attached to lever 235 and to cabinet bracket 242 so as to keep lever 235 normally pulled down.

The operation of this control mechanism is as follows: When hose 216 is pulled out, the frictional grip between rollers 217, 218, 219 and the hose, due to the elastic deformation of the rollers against the hose, brought about by springs 224 and 225, causes the roller assembly to move outwardly with the hose, thereby tilting bracket 229 against the restraining action of spring 241, thereby lifting up lever 235 and causing control rod to move into the position shown, whereby the pump operating means are set in motion. Hose 216 can be pulled out further now after lug 238 has contacted stop 239, since guide rollers 217, 218 and 219 will now rotate, no further frictional travel of the roller unit being possible, and hose 216 will pass in rolling engagement between the guide rollers.

As long as tension is applied to hose 216, lever 235 will remain lifted up and the liquid pump will remain in operation. However, as soon as tension on hose 216 is relaxed, the retracting coil spring of the hose reel will pull the hose back and aided by the action of spring 241, lever 235 is moved downwardly by the frictional contact between guide rollers 217, 218 and 219 and hose 216 until lug 237 has come in contact with stop 240. Control rod 236, in being pulled down, also causes the control means to stop the pumping action. Hose 216 will continue to be retracted by its reel spring the guide rollers now rotating on the surface of the hose.

It will therefore be apparent that even a slight movement of the dispensing hose one way or the other will cause the pump to start or to stop without in any way requiring complicated mechanical means connected with the hose reel mechanism proper.

Referring specifically to the embodiments of my invention shown in Figures 1 to 14 inclusive it will be understood that the controlling means described are applicable to all dispensing devices in which a flexible hose can be stored within a housing when not in use and pulled out when fluid is to be dispensed and are not limited to the specific hose storing devices described comprising rotatable storing reels.

Having thus described my invention, what I claim as new and desire to secure by Letters Patent is:

1. A hose reel for a liquid dispensing system comprising a first support provided with a central bearing, a second support spaced from said first support and comprising a cylindrical member having a vertical wall formed with a central bearing in line with said first mentioned bearing, the other side of said cylindrical member being open, a reel having oppositely extending hubs adapted to rotate in said spaced bearings, said reel being of maximum diameter at one end and at said end having spaced apart, radially extending flange portions for receiving therebetween a hose coiled upon said end of the reel, one of said flange portions lying adjacent the open end of said cylindrical member, said reel within said cylindrical member being of decreased diameter, said stationary cylindrical member having an internal chamber provided with an inlet opening, a stationary supply line, means to connect said supply line to said inlet opening, said chamber having a discharge opening, a flexible hose having one end connected to said discharge opening, said hose being disposed in coiled formation about the smaller diameter of said reel, said reel having a second chambered portion having an inlet connection at the smaller diameter of the reel, said inlet connection being connected to the discharge end of said second mentioned hose, said second chamber having an outlet connected to the inlet end of said first mentioned flexible hose, and a coil spring having one end connected to said stationary support and having its opposite end connected to the adjacent hub of said reel, whereby constantly to urge said reel in one direction.

2. A hose reel device for discharging liquid comprising a stationary supply means adapted to supply liquid under pressure, flexible hose means adapted to discharge liquid under pressure, turnable reel means about which said flexible hose means are adapted to be coiled and from which they may be uncoiled discharge means at one end of said flexible hose means, inlet means at the other end of said flexible hose means to connect said flexible hose means to said turnable reel means, means to wind said turnable reel means, flexible connecting hose means adapted to be coiled on said reel means, means to connect one end of the said connecting hose to one end of the said turnable reel and the other end of said hose to the said stationary supply means, the said flexible connecting hose means being arranged so that its coils are tightened while the said discharge hose means are unreeled from the said turnable reel means and loosened when the said discharge hose means are wound up on said turnable reel means.

3. A hose reel device for discharging liquid under pressure comprising flexible hose means adapted to discharge liquid under pressure, turnable reel means, means to coil said hose about said reel, discharge means at one end of said flexible hose means, inlet means at the other end of said flexible hose means to connect said flexible hose means to said turnable reel means, means to wind said turnable reel means, flexible connecting hose means adapted to be coiled on said reel means and to be connected at its outlet end to the inlet of said flexible discharge hose means and at its inlet end to stationary or fixed supply means, stationary or fixed means adapted to supply liquid under pressure means to connect the said supply means to the inlet end of said flexible connecting hose means, the said flexible connecting hose means being adapted to have its coils tightened when the said discharge hose means are uncoiled from the said turnable reel means and to have its coils loosened when the said discharge hose means are coiled around the said turnable reel means, so that the volume of the liquid contained under pressure in the said discharge and the said flexible connecting hose means and its pressure remain substantially unchanged, and means to support the said flexible connecting hose means when its coils are loosened.

4. A hose reel device for discharging liquid under pressure comprising stationary tubular liquid passage means having inlet and outlet means, rotatable reel means adapted to be journalled on said stationary tubular liquid inlet means, said reel means comprising a liquid passage having screwed inlet and screwed outlet means, said reel comprising drum means suitable for winding and detachable flange means suitable for guiding flexible discharge hose means, said reel means also comprising detachable retaining drum means to retain the coils of a flexible connecting hose means, means to rotate the said rotatable reel means, screwed radially extending passage means connecting to the outlet means of said stationary tubular liquid passage means, detachable hose coupling means, adapted to be attached to said radially extending passage means, coiled flexible connecting hose means, adapted to be attached to the aforementioned detachable hose coupling means at its inlet end and to the second unit of detachable hose coupling means at its outlet end, the said connecting hose means being adapted to be coiled around the said stationary tubular liquid passage means and to be expanded into larger coils inside the aforementioned detachable retaining drum means, screwed means adapted to connect the said second unit of detachable hose coupling means to the screwed inlet means of the said liquid passage of the said reel means, flexible discharge hose means, adapted to be attached at its inlet end to the screwed outlet means of the hollow portion of the said reel means and to be wound around the aforementioned winding drum means and to be guided by the aforementioned detachable flange means of said reel means, the said flexible connecting hose means being adapted to have its coils tightened when the said flexible discharge hose means is being unwound from its reel drum means, and to have its coils loosened when the said discharge hose means is being wound up on its reel drum means.

5. In a hose reel device the combination of fluid supply means, means to start and stop fluid supply, rotatable reel means adapted to be rotated in reverse directions, means to rotate said rotatable reel means, fluid conducting means adapted to connect said fluid supply means with said reel means, flexible hose means having discharge means at one end and having at the other end connecting means to said rotatable reel means, means to coil hose means on said rotatable reel means, said hose being adapted to be uncoiled therefrom, movable operating means for the means to start and stop the said fluid supply, movable guide means for said flexible hose means, means to keep said movable guide means in permanent contact with said flexible hose means, to operably connect said movable guide means with said movable operating means, said movable operating means being adapted to be moved by said movable guide means in one direction to start said fluid supply when said flexible hose means are uncoiled from said rotatable reel means, and to be moved by said movable guide means in opposite direction to stop said fluid supply when said flexible hose means are coiled on said rotatable reel means.

6. In a hose reel device the combination of fluid supply means, means to start and stop said fluid supply, rotatable reel means adapted to be rotated in reverse directions, means to rotate said rotatable reel means, fluid conducting means adapted to connect said fluid supply means with said reel means, flexible hose means having discharge means at one end and having at the other end connecting means to said rotatable reel means, means to move said flexible hose means in one direction so as to be coiled on said rotatable reel means, said hose being adapted to be pulled away from said rotatable reel means to be uncoiled therefrom, movable operating means for the means to start and stop the said fluid supply, movable guide means for said flexible hose means, means to keep said movable guide means in close contact with said flexible hose means, said movable guide means being adapted to be moved by the said flexible hose means in one direction when the said flexible hose means are being moved in one direction and in the opposite direction, when said flexible hose means are being moved in opposite direction, means to limit the movement of said movable guide means, said limiting means being adapted not to interfere with the movement of the said flexible hose means while they are being coiled or uncoiled, means to operably and permanently link said movable guide means with said movable operating means, said movable operating means being adapted to be moved in one direction to start said fluid supply when said flexible hose means are being pulled away from said rotatable reel means and to be moved in opposite direction to stop said fluid supply, when said flexible hose means are being moved to coil on said rotatable reel means.

7. In a hose reel device the combination of fluid supply means, means to start and stop said fluid supply means, rotatable reel means adapted to be rotated in reverse directions, means to rotate said rotatable reel means, fluid conducting means adapted to connect said fluid supply means with said reel means, flexible hose means having discharge means at one end and having at the other end connecting means to said rotatable reel means, said flexible hose means being adapted to be coiled on said rotatable reel means in a number of spiral coils of increasing size, located substantially in the same plane and to be uncoiled therefrom with decreasing coil size, movable guide means in spaced location from the said reel means, adapted to guide said flexible hose means and to be moved in one direction by the said hose means when the spiral hose coils increase in size and to be moved in the opposite direction when the spiral hose coils decrease in size, the said movable hose guide means being operatively connected to the said means to start and stop the said fluid supply means, whereby movement of the said movable guide means starts the fluid supply means and movement of the said fluid supply means in the opposite direction stops the fluid supply, and means inducing the said movable guide means to move in the direction which causes the said fluid supply means to stop, without however preventing the said movable guide means to be actuated by the movement of the said hose means, when moved in the direction which causes the said fluid supply means to start.

GUSTAVE A. UNGAR.